R. HELLER.
TIRE MOLD.
APPLICATION FILED JAN. 29, 1920.

1,415,557.

Patented May 9, 1922.
2 SHEETS—SHEET 1.

Inventor
Robert Heller
By his Attorney

R. HELLER.
TIRE MOLD.
APPLICATION FILED JAN. 29, 1920.
1,415,557.
Patented May 9, 1922.
2 SHEETS—SHEET 2.
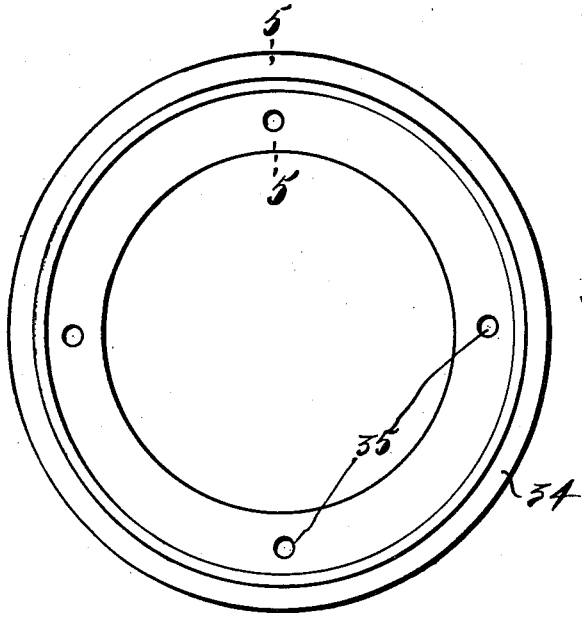
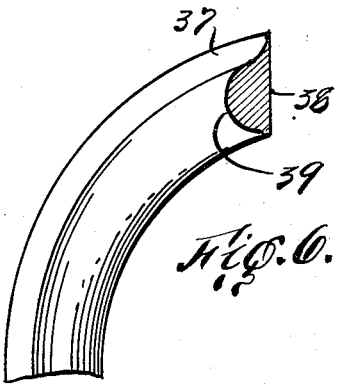
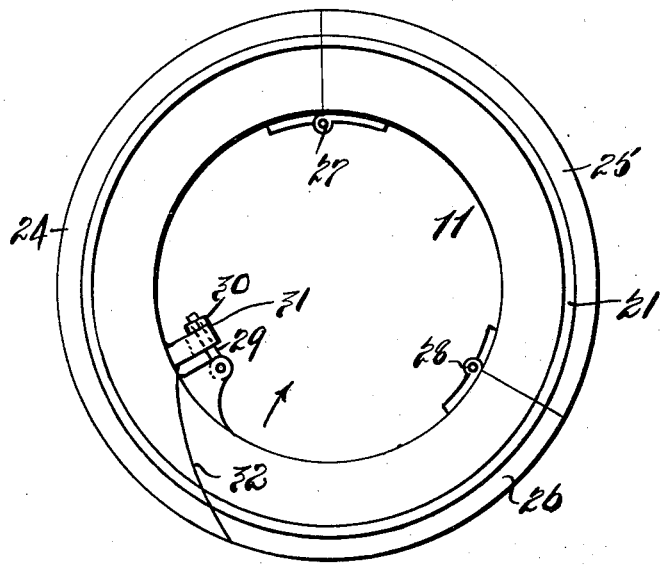
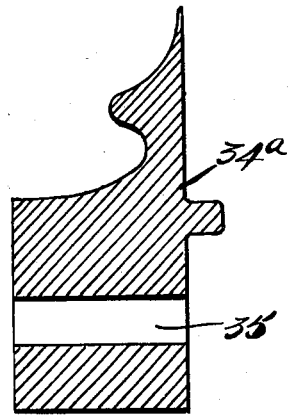
Inventor
Robert Heller
By his Attorney

UNITED STATES PATENT OFFICE.

ROBERT HELLER, OF BROOKLYN, NEW YORK, ASSIGNOR TO STANLEY TIRE & RUBBER CORPORATION OF DELAWARE.

TIRE MOLD.

1,415,557.   Specification of Letters Patent.   Patented May 9, 1922.

Application filed January 29, 1920. Serial No. 354,854.

*To all whom it may concern:*

Be it known that I, ROBERT HELLER, a citizen of Lithuania, residing at Brooklyn, Kings County, State of New York, have invented certain new and useful Improvements in Tire Molds, of which the following is a full, clear, and exact description.

This invention relates to improvements in tire molds, the object being to provide a mold specially designed for retreading tires. A retreaded tire, or one to be retreaded is one that has been in use for a considerable length of time and is therefore stretched or enlarged and hence cannot be placed in a mold employed to originally mold the tire, as said tire will be somewhat larger than the original mold. When retreading a tire, care has to be taken to avoid pinching the same due to the fact that the tire is stretched and not always symmetrically. To obviate these difficulties, I have designed a mold into which a stretched tire can be placed without fear of pinching same. I will now proceed to describe my invention in detail, the novel features of which I will point out in the appended claims, reference being had to the accompanying drawings, wherein:—

Fig. 3 is a detail side elevation of the beading ring;

Fig. 4 is a similar view of a modified form of beading ring;

Fig. 5 is a sectional view, taken on a line 5—5 in Fig. 4; and

Fig. 6 is a fragmentary perspective view of one of a pair of rings arranged to be fitted in the channel in the rings for clincher tires to produce a ring to fit a straight side tire.

Figure 2:
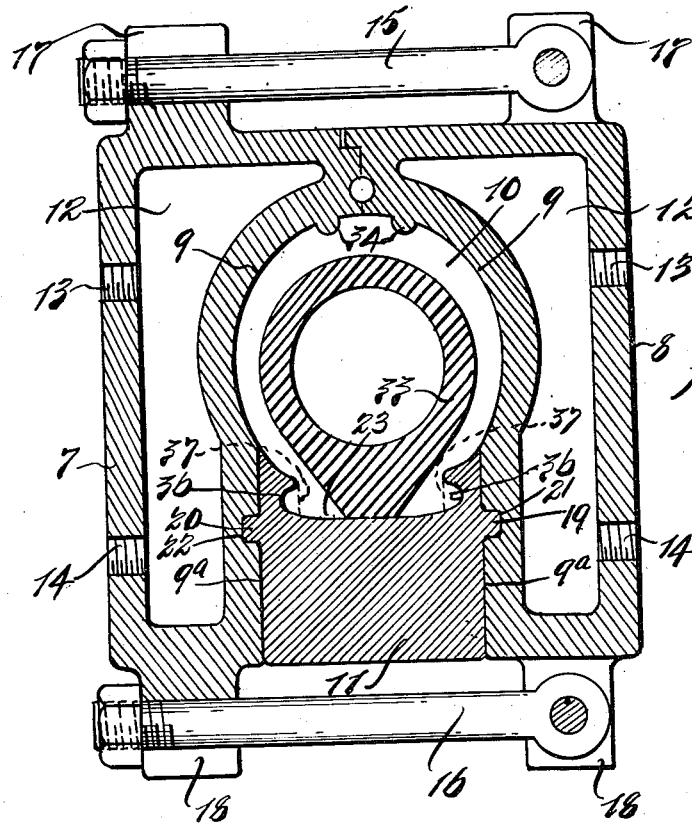
Fig. 2 is an enlarged sectional view, the section being taken on line 2—2 in Fig. 1.

As herein embodied, my invention consists of jacketed circular mold sections 7 and 8, each having an annular recess 9, said recesses, when the sections are placed together, forming a chamber or channel 10 to receive a tire, that is to say, the body of a tire or the greater part thereof. The beading portion of the tire is engaged by a beading ring 11 located between the sections 7 and 8. It will be evident from the above that the mold consists of sections, each having a recess, the depth of which is equal to one-half of the outside diameter of a tire, and a flat surface 9ª spaced from the center line of the mold, said flat surface extending from said recess to the inner periphery of the mold. When the mold sections are placed together, the recessed portions are caused to aline to provide a circular chamber, and the flat surfaces extending from the recesses form a channel to receive the beading ring. Into the spaces 12 of the mold sections, I introduce steam for the purpose of vulcanizing the treads to the body of the tire. The sections are provided with tapped openings 13 for the inlet of steam and outlets 14 to exhaust the steam, or vice versa. To secure the sections 7 and 8 together I employ securing bolts 15 and 16 passing through lugs 17 and 18, respectively.

Figure 1:
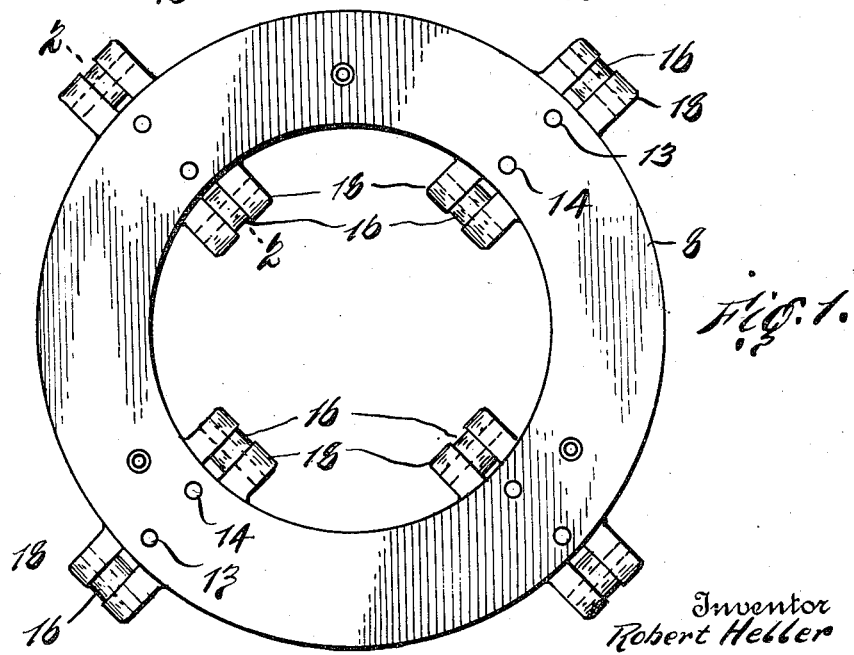
Fig. 1 is a side elevation of a mold embodying my improvements.

One of the chief features of my invention consists of the beading ring 11 which is fitted in the channel formed by the spaced apart flat surfaces 9ª, said beading ring being removable from the sections 7 and 8, when bolts 15 and 16 are removed. To hold the ring in place, I provide same with annular ribs 19 and 20 to fit annular grooves or channels 21 and 22 in the mold sections 7 and 8. The beading ring is provided with an annular channel 23 corresponding in formation to the shape of the beading portion of a clincher tire. The ring 11 is preferably made up of a plurality of sections 24, 25 and 26, the section 24 being hinged to section 25 as at 27, and section 25 hinged to section 26, as at 28, the sections 24 and 26 being separably connected by a releasable locking device, in this instance, a bolt 29 and nut 30, the bolt engaging a lug 31 on section 24. In order that the ring may be collapsed to facilitate its removal from a tire or application thereto, I form a bias joint 32 in order that section 26 can be forced inwardly, after which section 25 can be forced inwardly. In Fig. 2 an air-bag is indicated by 33. The air bag is a commonly known element in tire-molds and will not be referred to in detail. Usually a number of such bags are used to fill a tire when said tire is to be treated. The chamber 10 of the mold may have projecting thereinto points or projections 34 to produce a tread of a desired design. When a tire is to be retreaded it will first have applied to the beading portion thereof the beading ring 11. After the ring has been applied to the tire the locking nut 30 will be applied to bolt 29 to secure the ring in place. As the ring is jointed it can be easily applied or removed from a tire. After the ring has been applied to a tire, the sections 7 and 8 will be applied, it being of course understood that the air-bags will have been placed within the tire; and bolts 15 and 17 inserted to firmly bind the parts together. After the mold has been completely assembled, the spaces or jackets 12 will be filled with steam at the desired pressure or temperature. Instead of forming a ring such as 11, I may construct a ring made of two parts, one of said rings being indicated by 34ª, Fig. 4, and shown in section in Fig. 5. This form of beading ring will be bolted together through openings 35 after the members have been applied to the beading of a tire. It will be seen in Fig. 1 that the mold is in the form of a ring, that is to say, open for the circulation or passage of air through the central portion, which acts to maintain the beading ring comparatively cool or at least cool enough to prevent the beading of the tire from becoming overheated or overcured. In fact, one of the features of my invention is the air cooled beading ring 11.

So far as I am aware I am the first to employ an air cooled beading ring in molds of this nature. For tires having straight sides, I insert in the annular side recesses 36 of the channel 23 of the beading ring 11, fillers 37, Fig. 6 (see also dotted lines Fig. 1) having flat surfaces 38 and curved surfaces 39 to fit the recesses 36. It will of course be understood that the tires will be provided with the new tread portions, after which the tire and its new tread will be placed in the mold for vulcanizing. By providing the mold described I avoid pinching when the parts are bolted together, as the beading ring is applied to the tire before the body members 7 and 8 are fitted to the beading ring; hence, there will not be any danger of pinching the tire, for the reason that there are no joints or openings into which any part of the tire can protrude.

Having described my invention, what I claim and desire to secure by Letters Patent is:—

1. In a tire mold, a plurality of separably connected members, each member being recessed to form a chamber to receive the body portion of a tire when said members are connected, each member being further provided with a flat surface extending from the recessed portions, said flat surfaces being spaced from the center of the mold to form a channel, said flat surfaces each being provided with an annular groove, a bead engaging ring located in said channel, and ribs carried by said ring to engage the annular grooves.

2. In a tire mold, a plurality of separably connected members, each member being recessed to form a chamber to receive the body portion of a tire when said members are connected, each member being further provided with a flat surface extending from the recessed portions, said flat surfaces being spaced from the center of the mold to form a channel, said flat surfaces each being provided with an annular groove, a bead engaging ring located in said channel, ribs carried by said ring to engage annular grooves, said bead engaging ring consisting of a plurality of movably connected members.

3. In a tire mold, a plurality of separably connected members, each member being recessed to form a chamber to receive the body portion of a tire when said members are connected, each member being further provided with a flat surface extending from the recessed portions, said flat surfaces being spaced from the center of the mold to form a channel, said flat surfaces each being provided with an annular groove, a bead engaging ring located in said channel, ribs carried by said ring to engage annular grooves, said ring consisting of a plurality of sections hinged together.

4. A tire mold consisting of a plurality of separably connected members, said members comprising a plurality of body members and a bead engaging member consisting of a collapsible ring, insertable between the mold members, said ring having an annular recess or depression, the wall at each side of depression being grooved to form channels to receive the beading at the adjacent side of a tire.

5. In combination with a tire mold, a collapsible ring having an annular channel to receive the beading of a clincher tire, and filler members, insertable in said channel, having flat surfaces to bear against the corresponding flat surfaces of straight side tires.

6. In combination with a tire mold, a collapsible ring having an annular recess or depression, the wall at each side of the depression being grooved to form channels to receive the beading at the adjacent side of a clincher tire, a filler member having a convex surface to fit the groove in each wall of said ring, the opposite surface of the filler being flat, for the purpose set forth.

Signed at New York City, N. Y., this 29 day of December, 1919.

ROBERT HELLER.

Witnesses:
 EDWARD A. JARVIS,
 MAURICE BLOCK.